US006653759B1

(12) United States Patent
Ward et al.

(10) Patent No.: US 6,653,759 B1
(45) Date of Patent: Nov. 25, 2003

(54) COIL SUPPORT FINGER PLATE FOR STATOR OF POWER GENERATOR AND ASSOCIATED METHODS

(75) Inventors: Robert A. Ward, Rockledge, FL (US); Mehrzad Tartibi, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 89 days.

(21) Appl. No.: 09/666,684

(22) Filed: Sep. 20, 2000

(51) Int. Cl.[7] .............................. H02K 1/12; H02K 1/06
(52) U.S. Cl. ....................................... 310/254; 310/214
(58) Field of Search ........................... 310/270, 260, 310/254, 214–217

(56) References Cited

U.S. PATENT DOCUMENTS

| | | | | |
|---|---|---|---|---|
| 2,836,744 A | * | 5/1958 | Clawson | 310/208 |
| 3,735,169 A | * | 5/1973 | Balke et al. | 310/215 |
| 4,160,926 A | * | 7/1979 | Cope et al. | 310/215 |
| 4,160,929 A | * | 7/1979 | Thorington et al. | 313/112 |
| 6,072,259 A | * | 6/2000 | Kawabata et al. | 310/216 |

* cited by examiner

*Primary Examiner*—Nestor Ramirez
*Assistant Examiner*—Karen Addison

(57) ABSTRACT

A stator (10') for a power generator having a coil support finger plate (20') and associated methods are provided. The stator (10') preferably has a plurality of laminations or step irons having a plurality of spaced-apart stator coil slots (30') formed therein and stator coil slot contents (40) positioned in each of the plurality of stator coil slots (30'). The stator coil slot contents (40) preferably include at least one stator coil (43). The stator (10') also preferably has a coil support finger plate (20') positioned at an end portion of the plurality of stator coil slots (30'). The coil support finger plate (20') has a base (21') and a plurality of fingers (26, 27) extending outwardly from the base (21') between the plurality of spaced-apart stator coil slots (30'). The base (21') includes a stator slot contents support portion (25) positioned to underlie end portions of the stator slot contents (40) and to support the end portions of the stator coil slot contents (40) thereon so that the stator slot contents support portion (25) defines a stator slot bottom at the coil support finger plate (20').

7 Claims, 5 Drawing Sheets

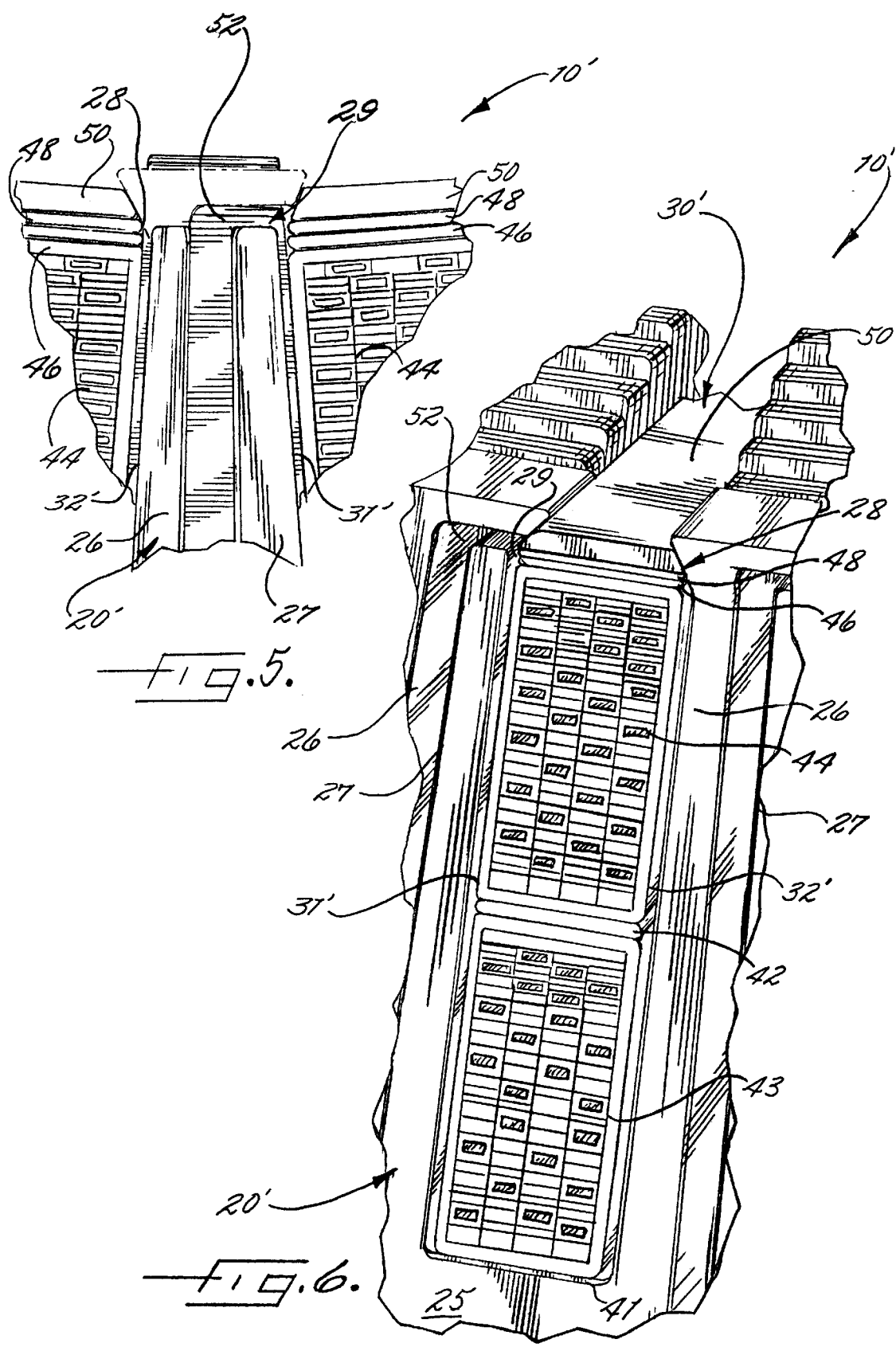

COIL SUPPORT FINGER PLATE FOR STATOR OF POWER GENERATOR AND ASSOCIATED METHODS

FIELD OF THE INVENTION

This invention is related to the power generation industry and, more particularly, to the field of turbine generators.

BACKGROUND OF THE INVENTION

In the power generation industry, turbine generators conventionally include a stator and a rotor. The stator 10 often includes a finger plate 20 having a base 21 and a plurality of spaced-apart fingers 23, 24 connected to and extending radially inwardly, as understood by those skilled in the art, from the base 21 as shown in the prior art of FIGS. 1–2. The fingers 23, 24 of the finger plate 20 extend radially inwardly between stator coil slots 30 formed in laminations 35 of the stator 10. Conventionally, as illustrated, the stator coil slots 30 have a pair of stator coils 33, 34, e.g., one overlying the other, positioned in the slot 30. The stator coil 33 closest to the finger plate base 21 was then only supported by side walls 31, 32 of the step irons and the bottom 19 of the stator slot 30 as shown.

Problems with this prior art type of finger plate 20 have been discovered, however. As shown in FIGS. 1–2, for these types of finger plates there is no contact between the base 21 of the finger plate 20 and the bottom of the coil 33 closest to the base 21 of the finger plate 20. During use, excessive vibrations within the stator coils 33, 34 can cause the deterioration of the stator coils 33, 34 and associated support structure. Also, stator slot wedges which assist in retaining the stator slot contents within the stator coil slot 30 can be desired to be used at the finger plate. The prior art finger plate 20, however, provides no support for mounting or positioning stator slot wedges within the stator coil slot 30 around the finger plate 20.

SUMMARY OF THE INVENTION

In view of the foregoing, the present invention advantageously provides a stator having a coil support finger plate which radially supports contents of a stator core coil slot. The present invention also advantageously provides a coil support finger plate for a stator and associated methods which substantially reduces the vibrations associated with conventional finger plate designs and thereby decreases stress or strain to stator coil insulation and reduces component failure. The present invention additionally advantageously provides a coil support finger plate which effectively extends the length of the stator coil slot or winding basket. The present invention further advantageously provides a finger plate for a stator which has wedge lands defined by portions of the fingers of the finger plate for mounting or positioning stator slot wedges therein so that the stator coils can then be supported by top or outer and bottom or inner portions of the finger plate as well.

More particularly, the present invention provides a stator for a power generator. The stator preferably has a plurality of laminations having a plurality of spaced-apart stator coil slots formed therein and stator coil slot contents positioned in each of the plurality of stator coil slots. The stator coil slot contents preferably include at least one stator coil. The stator also preferably has a coil support finger plate positioned at an end portion of the plurality of stator coil slots. The coil support finger plate has a base and a plurality of fingers extending outwardly from the base between the plurality of spaced-apart stator coil slots. The base includes a stator slot contents support portion positioned to underlie the stator slot contents and to support the stator coil slot contents thereon so that the stator slot contents support portion defines a stator slot bottom at the coil support finger plate.

Also, the present invention provides a coil support finger plate for a stator of a power generator. The coil support finger plate preferably includes a base and a plurality of fingers extending outwardly from the base so that at least one of the plurality of fingers also extends between end portions of a pair of stator coil slots when positioned adjacent thereto. The base preferably includes a stator slot contents support portion positioned to underlie contents of a stator coil slot and to radially support the stator coil slot contents thereon. The stator slot contents includes at least one stator coil.

Additionally, according to another aspect of the present invention, a coil support finger plate for a stator of a power generator is provided which preferably has a base and a plurality of fingers extending outwardly from the base so that at least one of the plurality of fingers also extends between end portions of a pair of stator coil slots when positioned adjacent thereto. The at least one of the plurality of fingers has a distal end portion thereof being positioned adjacent distal side peripheries of each of the end portions of the pair of stator coil slots and medial portions of the at least one of the plurality of fingers extending along only side peripheries of one of end portions of the pair of stator coil slots. Wedge lands for each of the pair of stator coil slots are formed in or defined by at least portions of the at least one of the plurality of fingers.

Further, the present invention provides a method for supporting a stator slot coil to thereby reduce vibrations within a stator. The method preferably includes radially supporting the bottom of the contents of a stator coil slot by the use of a coil support finger plate having a base portion thereof which defines a stator coil slot bottom. The method can also include positioning first and second stator coil slot wedges each to overlie a corresponding one of end portions of first and second stator coil slots and in first and second spaced-apart, wedge lands formed in the coil support finger plate. The first wedge land for the first wedge is preferably formed in a distal end portion of at least one finger of the coil support finger plate extending between end portions of the first and second stator coil slots. The second wedge land for the second wedge is preferably formed in the distal end portion of the same at least one finger of the coil support finger plate.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 5 is a fragmentary front elevational view of a stator having a coil support finger plate according to the present invention; and FIG. 6 is a fragmentary perspective view of a stator having a coil support finger plate according to the present invention.

DETAILED DESCRIPTION OF PREFERRED EMBODIMENTS

Figure 1:
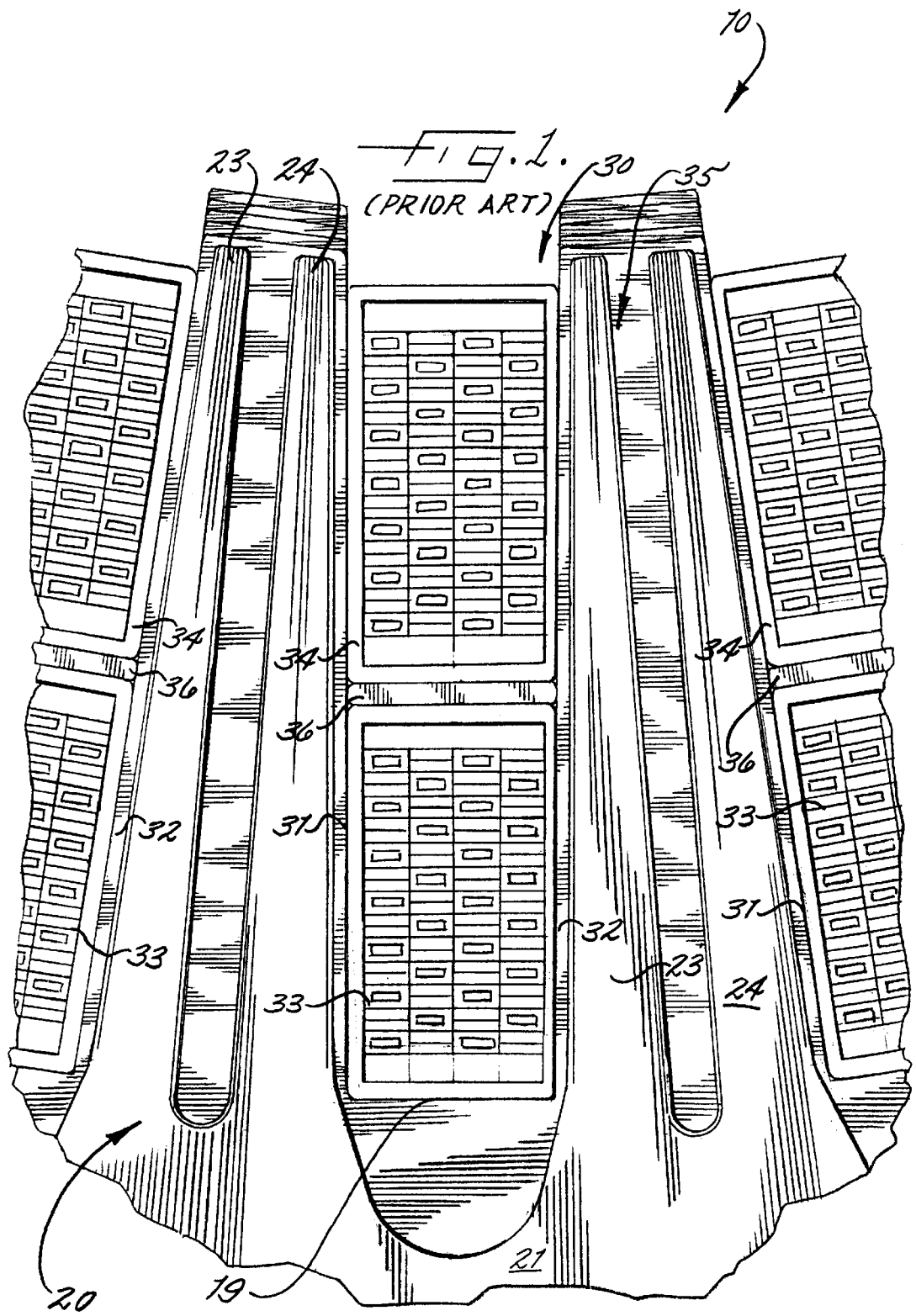
FIG. 1 is a fragmentary front elevational view of a stator having a finger plate according to the prior art.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

FIGS. 3–6 illustrate portions of a stator 10' having a coil support finger plate 20' for the stator 10' of a turbine generator according to the present invention. A stator 10 for a power or turbine generator is well known to those skilled in the art and, for brevity purposes, much of the additional details of the present stator 10' outside of the novel aspects emphasized will not be described herein. The stator 10' of the present invention is improved by having a novel coil support finger plate 20' as illustrated and described further herein. The stator 10' preferably has a plurality of laminations 35' having a plurality of spaced-apart stator coil slots 30' formed therein and stator coil slot contents 40 positioned in each of the plurality of stator coil slots 30'. The stator coil slot contents 40 preferably include at least one stator coil 43, and more preferably a pair of adjacent stator coils 43, 44 as shown. A first stator coil 43 of the pair preferably overlies (or underlies depending on the orientation of the stator) and abuttingly contacts a conformable material layer 41, e.g., conforms to stress, pressure, or weight to in the shape of the coil or other overlying structure, and a second stator slot coil 44 overlies the first stator slot coil 43 within the stator coil slot 30'. A coil spacer 42 is preferably positioned between the first and second slot coils 43, 44 as shown. The stator coil slot contents 40 can also advantageously include additional spacers 46 and slot fillers or filler blocks 48 positioned to overlie or distally extend from the second stator coil 44.

Figure 2:
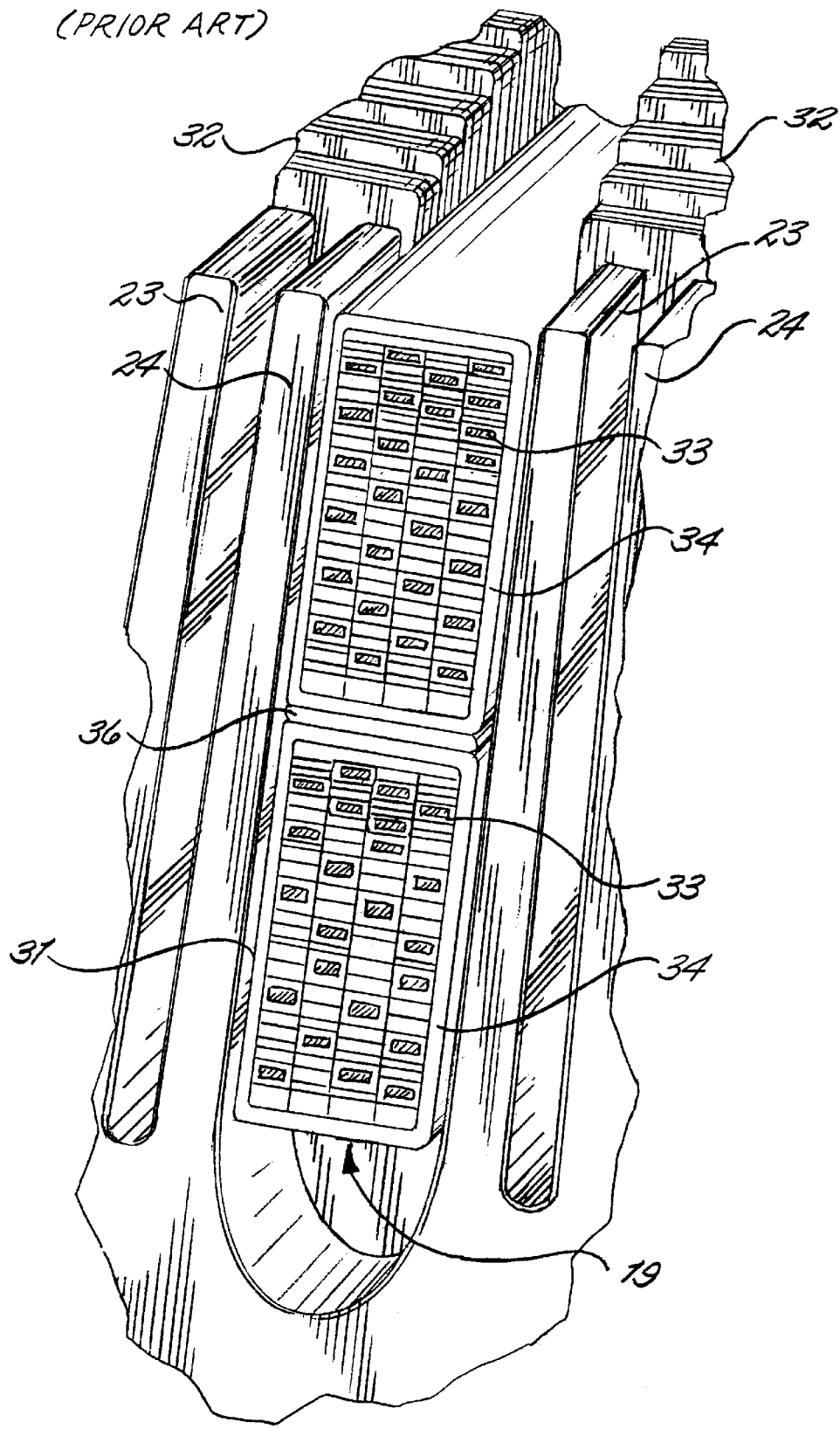
FIG. 2 is a fragmentary perspective view of a stator having a finger plate according to the prior art.

The stator 10 also preferably has a coil support finger plate 20' positioned at an end portion of the plurality of stator coil slots 30'. The coil support finger plate 20' has a base 21' and a plurality of fingers 26, 27 extending outwardly from the base 21' between end portions of the plurality of spaced-apart stator coil slots 30'. Unlike the prior art as shown in FIGS. 1–2, the base 21' of the coil support finger plate 20' includes a stator slot contents support portion 25 positioned to underlie the stator slot contents 40 and to support the stator coil slot contents 40 thereon so that the stator slot contents support portion 25 defines a stator slot bottom at the coil support finger plate 20' (see FIG. 3). Although the stator slot of the prior art had a bottom, it did not have a bottom at the finger plate 20 (see FIGS. 1–2).

Figure 3:
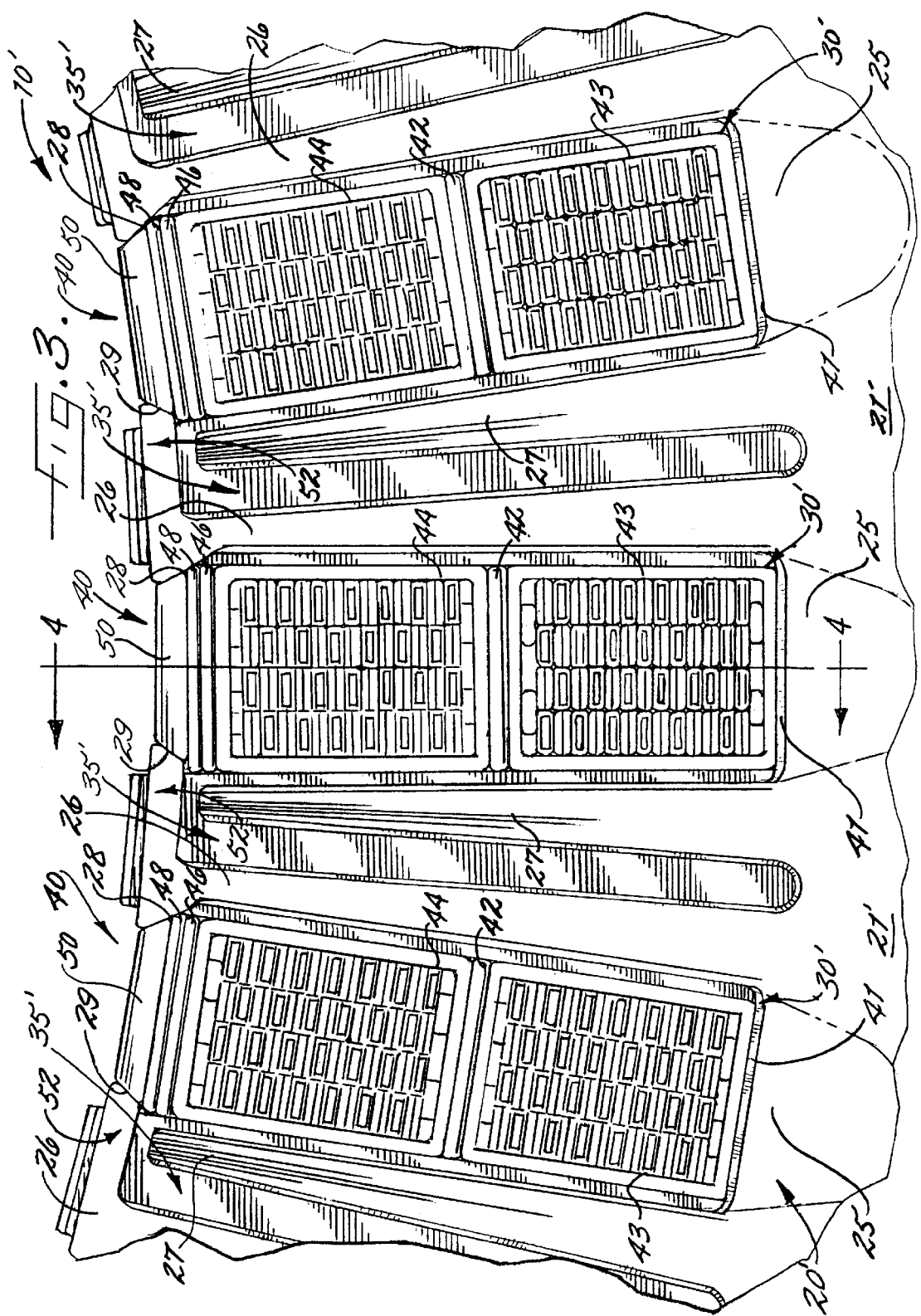
FIG. 3 is a fragmentary front elevational view of a stator having a coil support finger plate according to the present invention.
Figure 4:
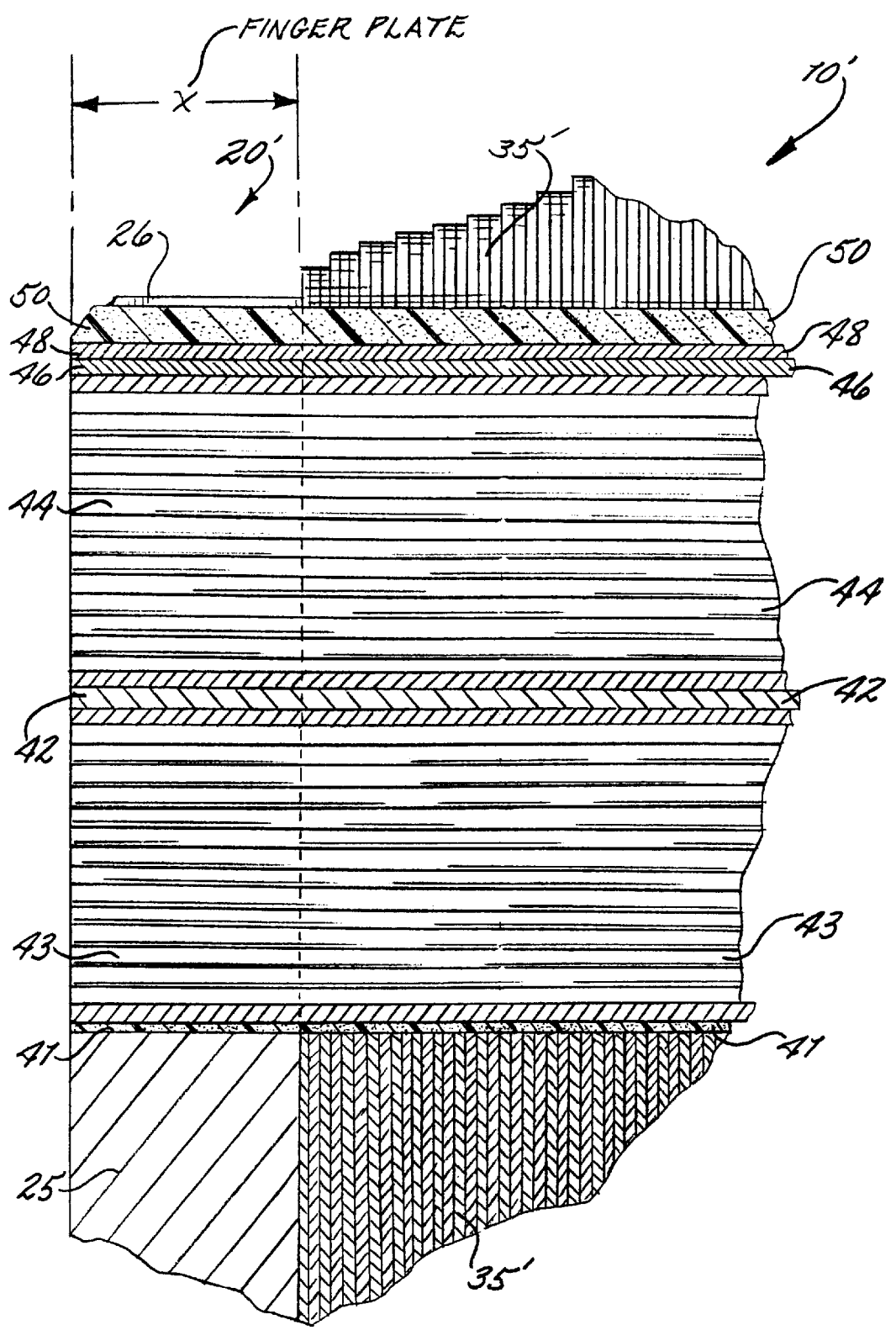
FIG. 4 is a sectional view of a stator having a coil support finger plate taken along line 3—3 of FIG. 2 according to the present invention.

As perhaps best illustrated in FIGS. 3–4, the stator slot contents 40 abuttingly contact the stator slot bottom 25 so that the stator slot bottom 25 of the coil support finger plate 20' radially supports the stator slot contents 40. The stator slot contents 40 preferably include a layer 41 of readily conformable material, e.g., provided by a cushion of material, e.g., formed of Dacron and resin in a sealed Mylar bag or container, underlying the at least one stator coil 43 to enhance protection of the at least one stator coil 43 from the outer surface of the stator slot bottom 25. In other words, the conformable layer 41 readily conforms and shapes to the outer contours of the coil 43 to provide cushioning support when resting on or contacting the bottom 25. The conformable material layer 41 preferably overlies and abuttingly contacts the stator slot bottom 25 and underlies and abuttingly contacts the stator coil 43 positioned closest to the base 21' of the coil support finger plate 20' so that the stator slot bottom 25 supports both the conformable material layer 41 and the at least one stator coil 43, as well as other slot contents 40, at the coil support finger plate 20'.

As shown in FIGS. 3 and 5–6, the plurality of fingers 26, 27 of the coil support finger plate 20' includes a plurality of spaced-apart pairs of fingers 26, 27. The stator coil slot bottom 25 is positioned between each of the plurality of spaced-apart pairs of fingers, e.g., 26, 27, and 26, 27 and at least a pair of fingers 26, 27 of the plurality of fingers of the coil support finger plate each extend outwardly between an adjacent pair of the plurality of spaced-apart stator coil slots 30' and 30'. The at least a pair of fingers includes first 26 and second 27 fingers. Distal end portions of the first finger 26 extend outwardly a greater distance from the base 21' than the second finger 27.

The first and second fingers 26, 27 are spaced-apart from each other, and the greater-distance extending distal end portions of first finger 26 are positioned adjacent distal side peripheries 31', 32' of each of the adjacent pair of stator coil slots 30' (i.e., when viewed from the ends of the stator coil slots 30' or from a front elevational view of the finger plate 20') and spaced-apart from distal end portions of the second finger 27. Medial portions of the first finger 26 extends along only side peripheries 32' of one of the pair of stator coil slots 30' or the step irons (i.e., when viewed from the ends of the stator coil slots 30' or from a front elevational view of the finger plate 20'), and the second finger 27 extends along only side peripheries 31' of another one of the pair of stator coil slots 30' (i.e., when viewed from the ends of the stator coil slots 30' or from a front elevational view of the finger plate 20').

This configuration of the first and second fingers 26, 27 advantageously allows the distal end portions of the first finger 26 to have a first wedge land 28 formed in a region thereof adjacent the one of the pair of stator slot coils 30', and the spaced-apart region between the distal end portions of the second finger 27 and the distal end portions of the first finger 26 define a second wedge land 29 for the another one of the pair of stator coil slots 30' so that the first wedge land 28 for the one stator slot 30' is formed by a first pair of fingers 26, 27 having first and second fingers thereof and the second wedge land 29 for the one stator slot 30' is formed by a second pair of fingers 26, 27 having first and second fingers thereof. The first and second wedge lands 28, 29 together in combination are spaced-apart as shown and define a wedge land. The second wedge land 29 preferably includes an extended wedge capture region 52 positioned to capture extended regions of a wedge 50 when positioned therein to thereby enhance the securing of the wedge 50 within the first and second wedge lands 28, 29, if so desired. As understood by those skilled in the art, the finger plate 20' advantageously has wedge lands 28, 29 defined by portions of the fingers of the finger plate for mounting or positioning stator slot wedges 50 therein so that the stator coils can then be supported by both top or inner and bottom or outer portions of the finger plate 20' as well.

As illustrated in FIGS. 3–6, the present invention also provides a method for supporting a stator coil 43 or stator slot contents 40 to thereby reduce vibrations within a stator 10'. The method preferably includes radially supporting the bottom 25 of the contents 40 of a stator coil slot 30' by the use of a coil support finger plate 20' having a base portion thereof which defines a stator coil slot bottom 25. The method can also include positioning first and second stator coil slot wedges 50 and 50 each to overlie a corresponding respective one of first and second stator coil slots 30' and 30' and in first and second spaced-apart, wedge lands 28, 29 formed in the coil support finger plate 20'. The first wedge land 28 for the first wedge 50 is preferably formed in a distal end portion of at least one finger 26 of the coil support finger plate 20' extending between the first and second stator coil slots 30' and 30'. The second wedge land 29 for the second wedge 50 is preferably formed in the distal end portion of the same at least one finger 26 (see, e.g., phantom lines of FIG. 5) of the coil support finger plate 20'. The method can further include the at least one finger 26 also having medial portions thereof which extend along side peripheries 32 of only one of the first and second stator coil slots 30'.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A stator for a power generator, the stator comprising:
   a plurality of laminations having a plurality of spaced-apart stator coil slots formed therein;
   stator coil slot contents positioned in each of the plurality of stator coil slots, said stator coil slot contents including at least one stator coil;
   a coil support finger plate positioned at an end portion of the plurality of stator coil slots, the coil support finger plate having a base and a plurality of fingers extending outwardly from the base between the plurality of spaced-apart stator coil slots, the base including a stator slot contents support portion positioned to underlie end portions of the stator slot contents and to support the end portions of the stator coil slot contents thereon so that the stator slot contents support portion defines a stator slot bottom at the coil support finger plate;
   wherein the plurality of fingers includes a plurality of spaced-apart pairs of fingers, wherein the stator coil slot bottom is positioned between each of the plurality of spaced-apart pairs of fingers, and wherein at least a pair of fingers of the plurality of fingers of the coil support finger plate each extend outwardly between an adjacent pair of end portions of the plurality of spaced-apart stator coil slots the at least a pair of fingers including first and second fingers, distal end portions of the first finger extending outwardly a greater distance from the base than the second finger;
   wherein the first and second fingers are spaced-apart from each other and the greater-distance extending distal end portions of first finger being positioned adjacent distal side peripheries of each of the adjacent pair of end portions of stator coil slots and spaced-apart from distal end portions of the second finger, wherein medial portions of the first finger extends along only side peripheries of one of the end portions of the pair of stator coil slots, and wherein the second finger extends along only side peripheries of another one of the end portions of the pair of stator coil slots; and
   wherein the distal end portions of the first finger has a first wedge land formed in a region thereof adjacent the one of the end portions of the pair of stator slot coils, and wherein the spaced-apart region between the distal end portions of the second finger and the distal end portions of the first finger define a second wedge land for the another one of the end portions of the pair of stator coil slots so that the first wedge land for the end portion of the one stator slot is formed by a first pair of fingers having first and second fingers thereof and the second wedge land for the end portion of the one stator slot is formed by a second pair of fingers having first and second fingers thereof.

2. A stator as defined in claim 1, wherein the second wedge land includes an extended wedge capture region positioned to capture extended regions of a wedge when positioned therein to thereby enhance the securing of the wedge within the first and second wedge lands.

3. A coil support finger plate for a stator of a power generator, the coil support finger plate comprising:
   a base; and
   a plurality of fingers extending outwardly from the base so that at least one of the plurality of fingers also extends between end portions of a pair of stator coil slots when positioned adjacent thereto;
   wherein the base includes a stator slot contents support portion positioned to underlie contents of an end portion of a stator coil slot and to radially support the stator coil slot contents thereon, the stator slot contents including at least one stator coil;
   wherein the end portions of the stator slot contents abuttingly contact the stator slot contents support portion when positioned within a stator coil slot having the coil support finger plate so that the stator slot contents support portion defines a stator slot bottom at the coil support finger;
   wherein the stator slot contents include a layer of readily conformable material underlying the at least one stator coil to enhance protection of the at least one stator coil from the outer surface of the stator slot bottom, and wherein the conformable material layer overlies and abuttingly contacts the stator slot bottom and underlies and abuttingly contacts end portions of the at least one stator coil so that the stator slot bottom supports both the conformable material layer and the at least one stator coil;
   wherein the plurality of fingers includes a plurality of spaced-apart pairs of fingers, wherein the stator coil slot bottom is positioned between each of the plurality of spaced-apart pairs of fingers, and wherein at least a pair of fingers of the plurality of fingers of the coil support finger plate each extend outwardly between an adjacent pair of end portions of a plurality of spaced-apart stator coil slots of a stator, the at least a pair of fingers including first and second fingers, distal end portions of the first finger extending outwardly a greater distance from the base than the second finger;
   wherein the first and second fingers are spaced-apart from each other and the greater distance extending distal end portions of first finger being positioned adjacent distal side peripheries of each of the adjacent pair of end portions of stator coil slots and spaced-apart from distal end portions of the second finger, wherein medial portions of the first finger extends along only side peripheries of one of the pair of stator coil slots, and wherein the second finger extends along only side peripheries of another one of the pair of stator coil slots; and wherein the distal end portions of the first finger has a first wedge land formed in a region thereof adjacent the one of the end portions of the pair of stator slot coils, and wherein the spaced-apart region between the distal end portions of the second finger and the distal end portions of the first finger define a second wedge land for the another one of the end portions of the pair of stator coil slots so that the first wedge land for the one stator slot is formed by a first pair of fingers having first and second fingers thereof and the second wedge land for the one stator slot is formed by a second pair of finger having first and second fingers thereof.

4. A coil support finger plate as defined in claim 3, wherein the second wedge land includes an extended wedge capture region positioned to capture extended regions of a wedge when positioned therein to thereby enhance the securing of the wedge within the first and second wedge lands.

5. A coil support finger plate for a stator of a power generator, the coil support finger plate comprising:

a base; and a plurality of fingers extending outwardly from the base so that at least one of the plurality of fingers also extends between end portions of a pair of stator coil slots when positioned adjacent thereto, the at least one of the plurality of fingers having a distal end portion thereof being positioned adjacent distal side peripheries of each of the end portions of the pair of stator coil slots and medial portions of the at least one of the plurality of fingers extending along only side peripheries of one of the end portions of the pair of stator coil slots;

wherein the plurality of fingers includes a plurality of spaced-apart pairs of fingers, wherein the at least one finger comprises at least a pair of fingers, and wherein the at least a pair of fingers of the plurality of fingers of the coil support finger plate each extend outwardly between an adjacent pair of end portions of a plurality of spaced-apart stator coil slots of a stator, the at least a pair of fingers including first and second fingers, distal end portions of the first finger extending outwardly a greater distance from the base than the second finger;

wherein the first and second fingers are spaced-apart from each other and the greater-distance extending distal end portions of first finger being positioned adjacent distal side peripheries of each of the adjacent pair of the end portions of stator coil slots and spaced-apart from distal end portions of the second finger, wherein medial portions of the first finger extends along only side peripheries of one of the end portions of the pair of stator coil slots, and wherein the second finger extends along only side peripheries of another one of the end portions of the pair of stator coil slots; and wherein the distal end portions of the first finger has a first wedge land formed in a region thereof adjacent the one of the pair of stator coils, and wherein the spaced-apart region between the distal end portions of the second finger and the distal end portions of the first finger define a second wedge land for the another one of the end portions of the pair of stator coil slots so that the first wedge land for the one stator slot is formed by a first pair of fingers having first and second fingers thereof and the second wedge land for the one stator slot is formed by a second pair of fingers having first and second fingers thereof.

6. A coil support finger plate as defined in claim 5, wherein the second wedge land includes an extended wedge capture region positioned to capture extended regions of a wedge when positioned therein to thereby enhance the securing of the wedge within the first and second wedge lands.

7. A method for supporting a stator coil to thereby reduce vibrations within a stator, the method comprising:

radially supporting the bottom of end portions of the contents of a stator coil slot by the use of a coil support finger plate having a base portion thereof which defines a stator coil slot bottom; and further comprising positioning first and second stator slot wedges each to overlie a corresponding one of end portions of first and second stator coil slots and in first and second spaced-apart, wedge lands formed in the coil support finger plate, the first wedge land for the first wedge being formed in a distal end portion of at least one finger of the coil support finger plate extending between end portions of the first and second stator coil slots and the second wedge land for the second wedge being formed in the distal end portion of the same at least one finger of the coil support finger plate;

wherein the at least one finger also has medial portions thereof which extend along side peripheries of only one of the end portions of the first and second stator coil slots.

* * * * *